United States Patent
Lloyd et al.

(10) Patent No.: US 12,208,761 B2
(45) Date of Patent: Jan. 28, 2025

(54) ROLLCAGE PROTECTION

(71) Applicant: GEORGE TFE SCP, Monaco (MC)

(72) Inventors: John George Lloyd, Monaco (MC); Piers Christian Storey, Monaco (MC)

(73) Assignee: GEORGE TFE SCP, Monaco (MC)

(*) Notice: Subject to any disclaimer, the term of this patent is extended or adjusted under 35 U.S.C. 154(b) by 0 days.

(21) Appl. No.: 18/247,411

(22) PCT Filed: Oct. 25, 2021

(86) PCT No.: PCT/IB2021/059844
§ 371 (c)(1),
(2) Date: Mar. 30, 2023

(87) PCT Pub. No.: WO2022/090906
PCT Pub. Date: May 5, 2022

(65) Prior Publication Data
US 2023/0373427 A1    Nov. 23, 2023

(30) Foreign Application Priority Data

Oct. 29, 2020 (EP) .................................. 20020502

(51) Int. Cl.
*B60R 21/055* (2006.01)
*B60R 21/13* (2006.01)
(52) U.S. Cl.
CPC ............ *B60R 21/055* (2013.01); *B60R 21/13* (2013.01)
(58) Field of Classification Search
CPC ... B60R 21/13; B60R 2021/137; B60R 21/04; B60R 2021/0421; B60R 21/0428; B60R 21/055

(Continued)

(56) References Cited

U.S. PATENT DOCUMENTS 5,609,385 A * 3/1997 Daniel .................... B60R 21/04
296/187.05
5,683,782 A * 11/1997 Duchene .............. B29D 24/005
428/116

(Continued)

FOREIGN PATENT DOCUMENTS

EP        0919440 A1   6/1999
WO     2015193795 A1   12/2015

*Primary Examiner* — Paul N Dickson
*Assistant Examiner* — Caitlin Anne Miller
(74) *Attorney, Agent, or Firm* — Jason L DeFrancesco (57) ABSTRACT

Protective padding (1) for a bar (10) of a rollcage (100) of a vehicle (200) comprising a honeycomb cellular structure (2), a base sheet layer (4), an outer sheet layer (11), and connecting means (3) configured to connect the honeycomb cellular structure (2) to said bar (10); wherein said honeycomb cellular structure (2) comprises a plurality of interconnected open cells (8) having longitudinal axes (L) arranged so that, when the honeycomb cellular structure (2) is connected to the bar (10), part of said longitudinal axes (L) are oriented outwardly with respect to the bar (10) and towards the interior of the rollcage (100); said open cells (8) being configured to absorb energy by plastic deformation in response to a compressive load compressing the honeycomb cellular structure (2) against the bar (10); wherein the base sheet layer (4) is attached to a base face (15) of the honeycomb cellular structure (2) facing the outer surface (13) of the bar (10) and the outer sheet layer (11) is attached to a top face (16) of the honeycomb cellular structure (2) that is opposite to the base face (15).

18 Claims, 5 Drawing Sheets

(58) Field of Classification Search
USPC .......................................................... 280/756
See application file for complete search history.

(56) References Cited

U.S. PATENT DOCUMENTS

| | | | | |
|---|---|---|---|---|
| D393,827 | S | * | 4/1998 | Taylor .......................... D12/400 |
| 5,779,271 | A | * | 7/1998 | Dorow .................. B60R 21/055 |
| | | | | 296/187.05 |
| D414,458 | S | * | 9/1999 | Pagan .......................... D12/400 |
| 6,126,231 | A | * | 10/2000 | Suzuki .................. B60R 22/201 |
| | | | | 296/187.05 |
| 6,758,507 | B2 | * | 7/2004 | Tarahomi ................ B60R 21/04 |
| | | | | 293/109 |
| 7,735,864 | B2 | * | 6/2010 | Potocki .................... B60R 21/13 |
| | | | | 280/751 |
| D626,059 | S | * | 10/2010 | Jackson ....................... D12/401 |
| 8,091,286 | B2 | * | 1/2012 | Totani .................... B60J 5/0455 |
| | | | | 49/502 |
| 8,790,776 | B2 | * | 7/2014 | Zeller ...................... F41H 5/04 |
| | | | | 29/527.1 |
| 2002/0121787 | A1 | | 9/2002 | Tarahomi |
| 2004/0241388 | A1 | * | 12/2004 | Ray, Jr. .................. B60R 21/055 |
| | | | | 428/122 |
| 2006/0208467 | A1 | * | 9/2006 | Khouri .................. B60R 21/272 |
| | | | | 280/730.2 |
| 2008/0284206 | A1 | | 11/2008 | Potocki |
| 2015/0327331 | A1 | * | 11/2015 | Smith ............... B29C 66/53241 |
| | | | | 156/60 |

* cited by examiner

ROLLCAGE PROTECTION

TECHNICAL FIELD

The present invention relates to the field of energy absorption apparatuses for protecting occupants of vehicles from impacts. In particular, for protecting the driver from unintentional impacts against the rollcage of the vehicle due to an accident or a strong acceleration or deceleration.

BACKGROUND ART

In the state of the art is known the use of a rollcage for protecting the driver of a vehicle. A rollcage, or roll cage, is a framework of reinforcements protecting the driver in the event that the vehicle has an accident and/or, rolls on to its roof. In particular, the rollcage of a racing car is a framework arranged inside the vehicle chassis and around the driver. The rollcage is stronger than certain parts of the vehicle chassis (e.g. roof or doors), consequently the crushing or deformation of the rollcage is limited in case of an impact or rollover and the vehicle's occupant/s remain/s protected. These rollcages are normally made of metal bars connected each other so as to create a cage around the driver. Consequently, any impact of the driver's body with one of these bars during a collision can cause serious injuries to the driver.

In particular, the bars of the rollcage positioned besides or at the rear of the driver's head are considered the most dangerous for the safety of the driver. Despite all drivers of a racing car wear helmets, the impact of the helmet against these bars can be fatal in certain cases.

For this reason, protective paddings for rollcages are known and available in the state of the art. An example of a rollbar padding is described in the patent document US20040241388A1. This padding is made of a resilient material and surrounds a side of a metal bar so as to realize a bumper.

Other paddings having a cylindrical shape and pads which wrap around the bars of the rollcage are known. These cylindrical paddings, like the padding of US20040241388A1, soften impacts. This elastic padding elastically absorbs the energy of an impact, but generates rebound forces during the impact that are transmitted back to the driver's body. These kinds of elastic articles can thus reduce impact force but not injuries determined by the rebounding forces. This kind of rebounding force is able to break a bone or to create serious damage to the passenger's brain. Other similar solutions are described in the documents US20080284206A1 and EP0919440B1.

A further solution is known from the document U.S. Pat. No. 6,126,231 that describes an impact energy absorbing structure consisting of a pad having ribs arranged so as to form a hexagonal inner arrangement. This solution does not comprise a base structure that prevents a disconnection of the cells during an impact and maintains the cells oriented during the impact so as to maximize the energy-absorption through progressive buckling. Another similar solution is provided by the document WO2015/193795, which comprises a honeycomb material arranged in a shell that has not a base element. In case of an impact, the cells of the honeycomb will tend to separate, opening wide from below reducing the effectiveness of the structure to absorb energy effectively.

The solution disclosed in the document US20060208467A1 relates to a bar covered by a corrugated tube. This solution is unable to efficiently absorb impacts because the shape of the corrugated tube eases the flattening of the tube over the bar during an impact, nullifying its energy-absorbing effect.

The document US20020121787A1 discloses a solution wherein a honeycomb material is arranged in a foam material. Also in this case, the solution misses a base element capable of keeping the cells compact and joined during an impact.

Furthermore, all known padding for rollcages are heavy and the weight is a key-factor in racing cars or aircrafts.

No devices are actually able to solve all above-mentioned problems with a cheap and simple solution.

SUMMARY

Said and other inconvenients of the state of the art are now solved by a first scope of the present invention, that is a protective padding for a bar of a rollcage of a vehicle encasing at least an occupant, preferably the driver of the vehicle, even more preferably the driver and the co-driver of the vehicle. Said protective padding comprises a honeycomb cellular structure and connecting means configured to connect the honeycomb cellular structure to said bar. Said honeycomb cellular structure comprises a plurality of interconnected open cells having respective longitudinal axes. A part of these cells have longitudinal axes oriented outwardly with respect to the bar and towards the inner side of the rollcage, in particular towards the zone wherein the occupant sits. Said cells are configured to absorb energy by plastic deformation in response to a compressive load that compresses the honeycomb cellular structure against the bar. A base face of the honeycomb cellular structure is arranged over the bar, while a top face, that is opposite to the base face, faces towards the interior of the rollcage. A base sheet layer is attached to the base face and an outer sheet layer is attached to the top face. When the honeycomb cellular structure is connected to the bar, the base sheet layer remains sandwiched between the honeycomb cellular structure and the bar. The protective padding is configured to remain directly exposed in the rollcage, thus without any additional cover. This protective padding, differently from known traditional bumpers, absorbs the energy of an impact irreversibly deforming its structure. In this way, rebounding forces, typical of elastic honeycombs, are avoided. Furthermore, being the cells opened, thus internally empty, the weight of this padding is reduced with respect to foam paddings. Furthermore, the sheet layers allow the honeycomb cellular structure to maintain its integrity during an impact. In particular, the outer sheet layer allows to spread the impact energy on a wider number of open cells involving more cells in the impact absorption. The base sheet layer allows a better and more stable connection of the protective padding over the bar. Moreover, the base sheet layer prevents a disconnection of the cells during an impact and maintains the cells orientation during the impact so as to maximize the energy-absorption through progressive buckling of the cells. The cells are kept grouped and do not separate, opening wide when compressed against the bar.

One or both said base sheet layer and outer sheet layer can be a polymeric woven or non-woven fabric, a polymeric film or a composite laminate layer firmly attached to front edges of said open cells through an adhesive, preferably a heat-activated adhesive The base face of the honeycomb cellular structure can be flat or shaped so as to be complementary to an outer surface of the bar. In the former case, the manufacturing of the protective padding is simplified, while in the latter case, the contact surface between these elements is maximized and even a mate coupling can be achieved. Advantageously, the honeycomb cellular structure is shaped so as to partially surround the bar. In this way, the honeycomb cellular structure protects the driver more efficiently from impacts against the bar. Moreover, the honeycomb cellular structure can easily remain in position over the bar being its shape complementary to that of the bar.

The longitudinal axes of the cells can be parallel to each other, for defining a specific direction of absorption of impacts or radially oriented for absorbing impacts coming from any direction.

At least a part of the longitudinal axes of said cells can be orthogonal to said base face or to a fictitious plane tangent to said base face. In this way, the energy absorption of impacts is optimized.

Alternatively, at least a part of the longitudinal axes of said cells are inclined by an angle 5°-45° with respect to a direction normal to said base face or to a fictitious plane tangent to said base face. These axes are angled to reduce the initial compressive strength peak of the honeycomb and allow it to compress at lower energies when the helmet hits the protective padding, reducing the resultant force transmitted to the occupant's head.

Preferably, the outer sheet layer can be an outer cushion arranged at least in part over a top face of the honeycomb cellular structure. The outer cushion allows more cells to be involved in the impact absorption and also works like a comfort pad for the driver/occupant.

The connecting means can be of different types. Preferably, the connecting means can comprise one or more clip elements configured to clamp the bar and support the honeycomb cellular structure with respect to the bar. This solution allows to set a position of the honeycomb cellular structure and its sheet layers with respect to the bar. Advantageously, the connecting means can comprise at least a fastener, which ties in one or more points the honeycomb cellular structure to the bar. More preferably, the fastener is a cable tie.

Preferably, the clip element can comprise a groove configured to house at least partially said fastener. This groove contributes to a correct relative positioning of the fastener with respect to the clip, so as to achieve a correct and firm positioning of the honeycomb cellular structure over the bar.

Alternatively, the connecting means can comprise a shell configured to enclose at least partially the honeycomb cellular structure and part of the bar. The honeycomb cellular structure is thus clamped to the bar and protected by the shell.

In a further alternative, the connecting means can comprise a glue layer for attaching the honeycomb cellular structure to the bar.

The connecting means connect the honeycomb cellular structure directly to the bar.

In particular, the cells can be tubes interconnected each other through their sidewalls so as to form said honeycomb cellular structure. Preferably, the tubes are cylindrical tubes. This kind of structure was found very efficient for plastically absorbing the energy of a compressive force. Each cell provides an its own absorption of the impact-energy and, being connected to other cells, drags other cells in this energy absorption.

Advantageously, the diameter of said cylindrical tubes can range between 2.5 and 6 mm and/or the thickness of said sidewalls of the cells can be less than 0.3 mm, and preferably it can range between 0.06 and 0.15 mm. These geometrical values provide optimized values of energy absorption in case of impacts of a helmet against the protective padding connected to the rollcage's bar.

A second scope of the present invention is represented by a vehicle comprising a rollcage configured to encase a driver/occupant, wherein said rollcage comprises one or more bars, and one or more protective paddings according to the first scope of the present invention. The one or more protective paddings are connected to the one or more bars of the rollcage so as to face head-on towards the interior of the rollcage. The protective padding is directly exposed towards the area wherein the driver/occupant sits and no additional protective layers are present between them. The protective padding is thus sufficient by itself to absorb the impact of the driver/occupant. A vehicle so conceived, in particular if the vehicle is a racing car, is very light and protects more efficiently the driver/occupant from impacts against the rollcage. The present protective padding can be also employed in a jet aircraft or a space shuttle.

These and other advantages will be better understood thanks to the following description of different embodiments of said invention given as non-limitative examples thereof, making reference to the annexed drawings.

DETAILED DESCRIPTION

The following description of one or more embodiments of the invention is referred to the annexed drawings. The same reference numbers indicate equal or similar parts. The object of the protection is defined by the annexed claims. Technical details, structures or characteristics of the solutions herebelow described can be combined with each other in any suitable way.

Figures 1, 2, 3, 4:
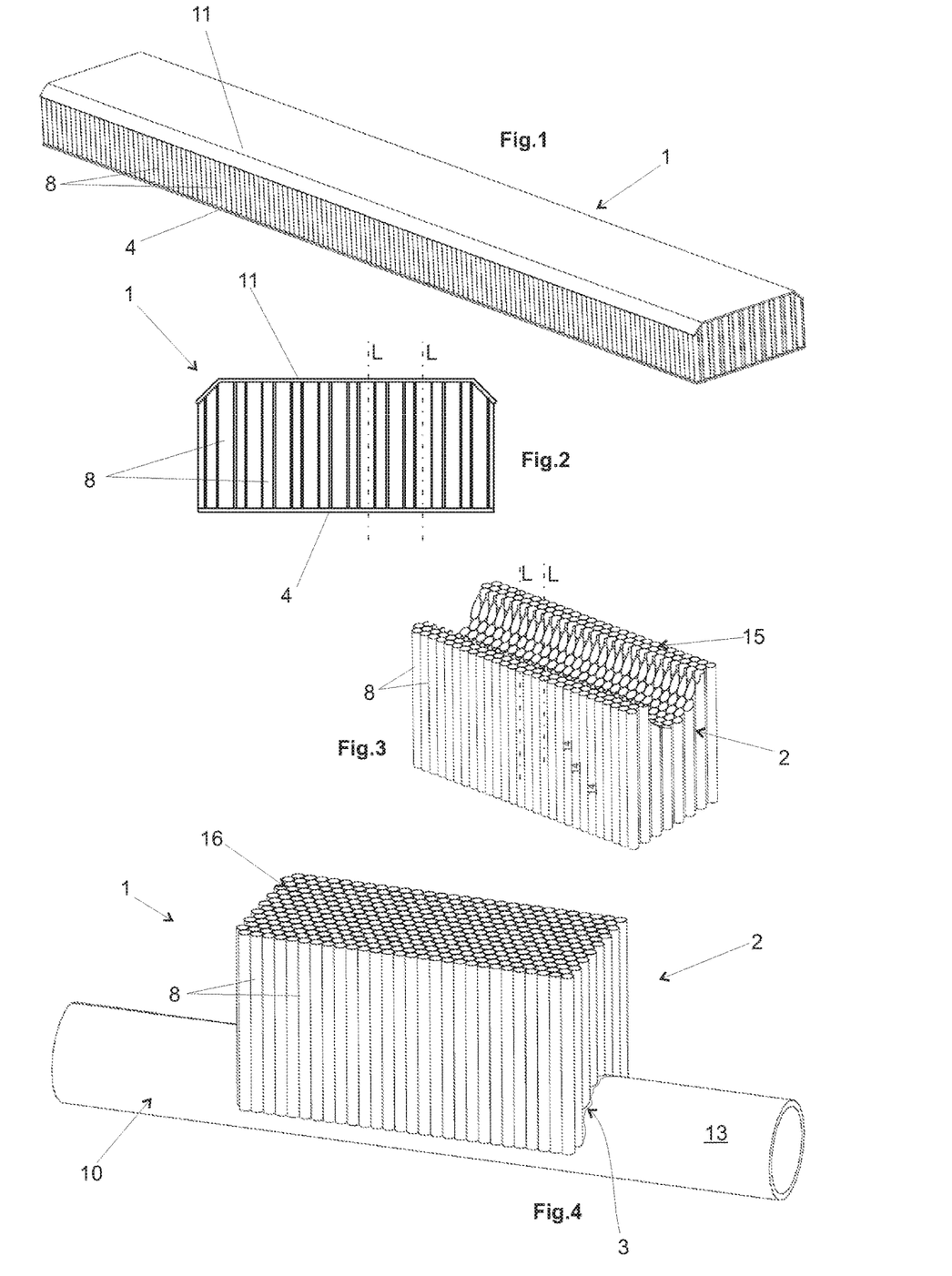
FIG. 1 shows an isometric view of a protective padding of the present invention.
FIG. 2 shows a front view of the protective padding of FIG. 1.
FIG. 3 shows an isometric view of a further protective padding of the present invention viewed from below and without sheet layers.
FIG. 4 shows an isometric view of the protective padding of FIG. 3 connected to a bar of a rollcage and without sheet layers according to the present invention.

In FIGS. 1 and 2 is represented a protective padding 1 before being arranged on a bar 10 of a rollcage 100. A rollcage 100 is an inner framework of a vehicle 200 and is configured to encase a driver 300 as described later on with reference to FIGS. 9 and 10. The rollcage 100 is a framework attached but independent from the vehicle's chassis.

The protective padding 1 comprises a honeycomb cellular structure 2, a base sheet layer 4 and an outer sheet layer 11. The protective padding 1 also comprises connecting means 3. The connecting means 3 are configured to connect the honeycomb cellular structure 2 to the bar 10, as shown in FIGS. 4-8.

The honeycomb cellular structure 2 comprises a plurality of interconnected open cells 8 and each cell has a longitudinal axis L, as represented in FIGS. 1-3. Said honeycomb cellular structure 1 comprises a base face 15, that can be flat as represented in FIGS. 1 and 2 or shaped so as to be complementary to an outer surface 13 of the bar 10, as represented in FIGS. 3 and 4.

Furthermore, the honeycomb cellular structure 1 comprises a top face 16 that is opposite to the base face 15. This top face 15 can assume any shape, but preferably it is flat or slightly curved.

The protective padding 1 comprises an outer sheet layer 11 that covers entirely the top face 16, as presented in FIGS. 1 and 2.

This outer sheet layer 11 can be a polymeric woven or non-woven fabric, a polymeric film or a composite laminate firmly attached to the front edges of said open cells/tubes 8 through an adhesive.

In case of a woven or non-woven fabric, the adhesive permeates across the fibers of the fabric of the base sheet layer 4 and around the edges of cells 8.

This outer sheet layer 11 allows to spread the energy of an impact over a wider number of cells 8, improving the absorption of the impact energy. If the load is applied punctually, the outer sheet layer 11 drags more cells 8 in the crumpling, increasing the number of cells 8 involved in the absorption of the impact.

The outer sheet layer 11 follows the shape of the top face 16, covering it entirely, even if the top face 16 is not flat.

As represented in FIGS. 1 and 2, the protective padding 1 also comprises a base sheet layer 4, that covers entirely the base face 15. The base sheet layer 4 covers the base face 15, thus the lower base of the honeycomb cellular structure 2, while the outer sheet layer 11 covers the top face 16, thus the upper base of the honeycomb cellular structure 2.

This base sheet layer 4 is preferably a polymeric woven or non-woven fabric, a polymeric film or a composite laminate firmly attached to the edges of said open cells/tubes 8 through an adhesive.

The base sheet layer 4 is arranged over the base face 15 of the honeycomb cellular structure 2 so as to cover all the edges of the open cells 8.

In the case of a woven or non-woven fabric, the adhesive permeates across the fibers of the fabric of the base sheet layer 4 and around the edges of cells 8.

If the adhesive is of the heat-activated type, the assembly constituted by the honeycomb cellular structure 2 and the outer and base sheet layers 11,4 is heated at a temperature of activation of the adhesive, so that both the outer sheet and base layers 11, 4 bond with the cells 8. The heat-activated adhesive can be a thermoset polyester web film adhesive.

Due a firm and indissoluble connection, the base sheet layer 4 remains firmly connected to the cells 8 so that, if a load is applied to the protective padding 1, the sheet layer 4 guarantees that the plurality of cells 8 remain compact.

The composite laminate layer can be a thin layer of a composite material including fibreglass, aramid, kevlar and/or carbon fibers.

The polymeric film is a polyurethane, polyester, PVC or polycarbonate very thin layer, having thickness lower than 1 mm, preferably between 0.2 and 0.8 mm.

When an object strikes the top face 16 of the honeycomb cellular structure 2, the energy of the impact is spread by the outer sheet layer 11 over a wider number of cells 8, improving the response in terms of energy-absorption of the protective padding. Conversely, the base face 15 is compressed against the bar 10 and this compression tends to separate the cells 8 one from the other. The base sheet layer 4 maintains the cells 8 grouped during said compression.

The honeycomb cellular structure 2 can have sheet layers 4,11 only over the base, the top face 16 and base face 15 or a sheet layer wound around the entirety of the honeycomb cellular structure 2.

Preferably, the material of the base sheet layer 4 is configured to provide a predetermined level of friction (grip), so as to not slide over the bar 10. The material can comprise an elastomer for providing said grip effect.

The longitudinal axes L of said cells 8 are arranged so that, when the honeycomb cellular structure 2 is connected to the bar 10, at least some of them are oriented outwardly with respect to the bar 10, thus some of these longitudinal axes L point from the bar 10 towards outside, as shown in FIG. 6. When an impact occurs against the honeycomb cellular structure 1, for example caused by a helmet 400 worn by the driver 300 that hits the top face 16 of the honeycomb cellular structure 1, the cells 8 are longitudinally compressed. Since the cells 8 are arranged so as to have the longitudinal axes L oriented outwardly with respect to the bar 10, the cells 8 are longitudinally compressed by the helmet 400 against the bar 10. Under this compressive load, the cells 8 are configured to absorb the energy of said compression through a plastic deformation of said cells 8. The term "plastic deformation" means an irreversible deformation of the cells 8. Thus cells 8 deform irreversibly, or substantially irreversibly, crumpling on themselves like a bellow.

As represented in FIGS. 1 and 2, the honeycomb cellular structure 2 has a flat base face 15 so as to facilitate the manufacturing of this item through a straight cut of a bigger honeycomb piece. The top face 16 can have corners that are slightly inclined as shown in FIGS. 1 and 2. The rest of the top face 16 is flat and parallel to the base face 15.

As represented in FIGS. 3 and 4, the honeycomb cellular structure 2 has a base face 15 shaped so as to mate with the outer surface 13 of the bar 10. In this way the connection between the honeycomb cellular structure 2 and the bar 10 is facilitated, because the surface for connecting these two items is maximized.

When the assembly is observed in a cross-sectional view, the honeycomb cellular structure 2 lays on the bar 10 through its base face 15.

Preferably, the honeycomb cellular structure 2 partially surrounds the bar 10 as represented in FIGS. 6A-6D. In the specific embodiment of FIG. 6C, the honeycomb cellular structure 2 wraps the bar 10 more than half the circumference of the bar, to almost encircle the bar 10 itself.

As represented in FIGS. 1-5, 6A, 6B, 6D and 6E, the longitudinal axes L of the honeycomb cellular structure 2 are parallel to each other. Since the cells 8 are configured to axially progressively buckle, thus to crumple longitudinally, the longitudinal axes L are preferably oriented towards the item that risks to impact against the protective padding 1.

Since the rollcage 100 is a protective framework of metal bars 10 encasing the driver 300 of a vehicle 200, the helmet 400 or the body of the driver 300 can move in a zone 500 inside the rollcage 100, both in standard or extraordinary (accident) conditions.

The longitudinal axes L of the honeycomb cellular structure 2 are arranged so as to point towards this inner zone 500 of the rollcage 100. When the longitudinal axes L are all parallel to each other, all the longitudinal axes L point towards said zone 500. When the protective padding 1 is designed to protect other part/s of the occupant/driver body, the inner zone 500 is represented by the inner portion of the rollcage 100 wherein this part/s of the occupant/driver body can move.

Figures 6A, 6B, 6C, 6D, 6E:
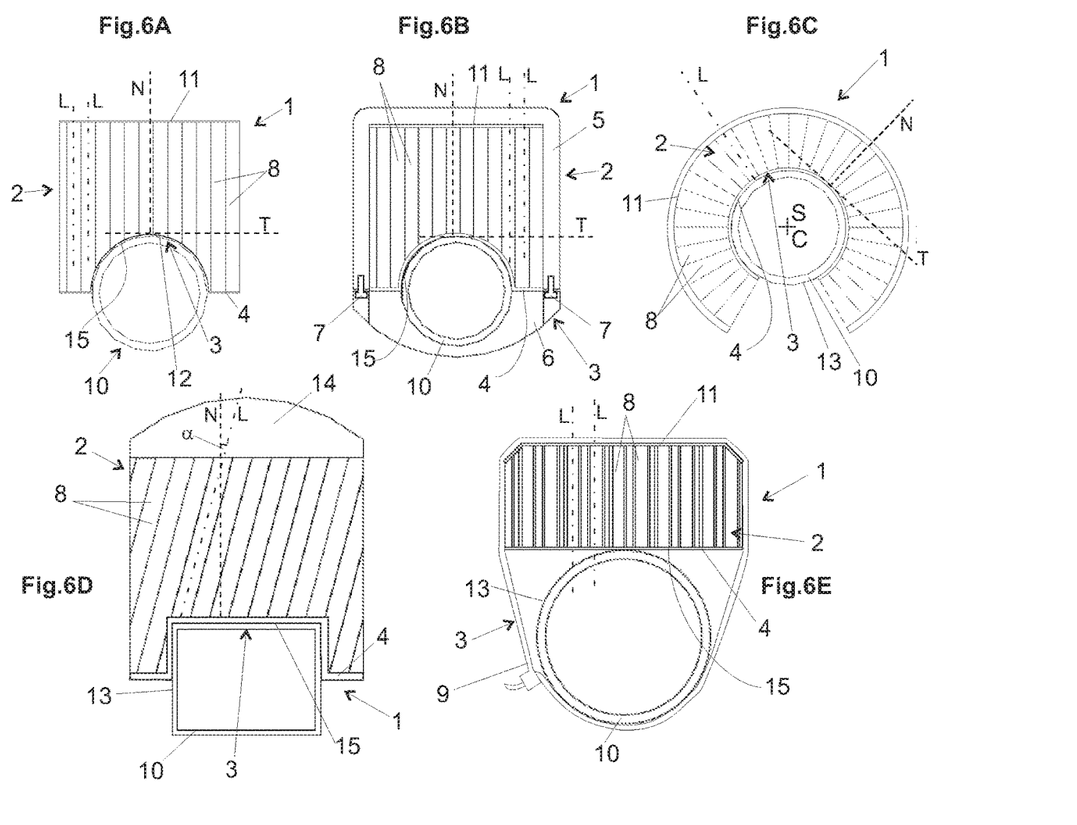
FIG. 6 show other embodiments of the protective padding connected to a bar of the rollcage according to the present invention.

In the alternative embodiment of FIG. 6C, the longitudinal axes L are radially oriented with respect to an axis of symmetry S of the honeycomb cellular structure 2. This axis of symmetry S substantially coincides with the axis C of the cylindrical bar 10 of FIG. 6C. This arrangement of the longitudinal axes L allows to absorb impacts coming from several directions. On the contrary, if the direction of impact is predictable, it's preferable to use a protective padding 1 having all longitudinal axes L parallel and oriented towards the zone 500, like those of FIGS. 6A,6B,6D,6E.

The longitudinal axes L of the cells 8 are preferably oriented in a direction N that is orthogonal to the base face 15. This arrangement allows to maximize the absorption of impacts that hit the protective padding 1. If the bar 10 is cylindrical, at least one group of cells 8 is orthogonal to the base face 15, as shown in FIG. 6E, or to a fictitious plane T that is tangent to said base face 15, as shown in FIGS. 6A and 6B. When the longitudinal axes L are all parallel and not inclined, as shown in FIGS. 6A, 6B, 6E, the longitudinal axes are oriented so as to ideally join the cylindrical bar 10 and said zone 500.

If the bar 10 has an outer polygonal cross-section, like that of FIG. 6D, the base face 15 can be accordingly shaped, for example C-shaped as shown in FIG. 6D, for partially wrapping the bar 10, or can be flat, so as to lay over it. In a particular embodiment (not shown), the longitudinal axes L are orthogonal to this base face 15.

Alternatively, the longitudinal axes L of the cells 8 are all parallel and inclined with respect to said C-shaped base face 15, as represented in FIG. 6D. In particular, the longitudinal axes L are inclined by an angle α with respect to a normal direction N coming out from the outer face 13 of the rectangular bar 10.

In a particular embodiment (not shown), the bar 10 is cylindrical and the longitudinal axes L of the cells 8 are inclined by said angle α with respect to a direction N that is normal to a fictitious plane T tangent to a half-cylindrical base face 15. In this embodiment (not shown), the honeycomb cellular structure 2 is similar to that of FIG. 6D, but the base face 15 is flat or cylindrical and longitudinal axes L are inclined with respect to a fictitious plane T. Said angle α is comprised between 5° and 45°, preferably, between 10° and 30°.

As represented in FIGS. 1-8, the cells 8 are tubes, so the terms cell and tube can be interpreted as synonyms. Each tube 8 has a sidewall 14 and open ends. Through said open ends and through the empty space surrounded by the sidewall 14 the air can flow. In this way, the spring effect provided by closed cells containing air is avoided. Each cell/tube 8 has two edges in correspondence of said opposite ends. Said cells/tubes 8 are interconnected each other via their sidewalls 14 so as to form said honeycomb cellular structure 2.

The tubes 8 of FIGS. 1-8 have circular cross-sections. In embodiments not shown, the cross-section of the cells/tubes 8 can be a square, a hexagon, a non-uniform hexagon, a re-entrant hexagon, a chiral truss, a diamond, a triangle or an arrowhead. Substantially, said tube has opened upper and lower bases having a shape constituted by a closed broken and/or curved line.

In particular, the cross-section of the cells/tubes can be shaped so that the honeycomb cellular structure 2 exhibits a monoclastic or synclastic behaviour. This behaviours allows to the honeycomb cellular structure 2 to wound the bar 10 of the rollcage 1000 without using thermoforming to modify the shape of the honeycomb 2.

Alternatively, the cells 8 can be the cells of a lattice structure that is not tubular or any hollow structure having a regular or irregular geometry.

The tubes 8 can be welded together via their sidewalls 14. Alternatively, the tubes 8 can be bonded by means of adhesive layers interposed between adjacent sidewalls 14. In a further alternative, the tubes are monolithically connected to each other through an extrusion process or 3D-printed all together. The tubes 8 are connected so as to minimize the gap between adjacent tubes 8.

When the cells 8 have a circular cross-section, the outer diameter of the circular cross-section can range between 2.5 and 6 mm, and the wall thickness of said sidewall 14 is less than 0.3 mm, preferably it ranges between 0.06 and 0.15 mm. According to these dimensional values, the energy absorption is optimized. Furthermore, these values allow a very light protective padding 1.

The cells 8 can be made of polycarbonate, polypropylene, polyetherimide, polyester or polyethylene, consequently the mechanical behaviour of said cells 8 is substantially constant in the range of temperature −30° C. to +100° C.

The honeycomb cellular structure 2 is shaped to have a length that is two or more times longer in its height or width, as represented in FIG. 1.

Alternatively, the protective padding 1 can comprise an outer cushion 14 arranged over the top face 16 of the honeycomb cellular structure 2, as represented in FIG. 6D. This cushion 14 acts as outer sheet layer 11 and makes the protective padding 1 more comfortable in case of soft impacts of the helmet 400 against the protective padding 1. This cushion 14 can be made of a polymeric foam material like an EPP (Expanded Polypropylene) or EPS (Expanded Polystyrene).

In order to connect the honeycomb cellular structure 2 to the bar 10, one or more connecting means 3 are provided.

Figure 5:
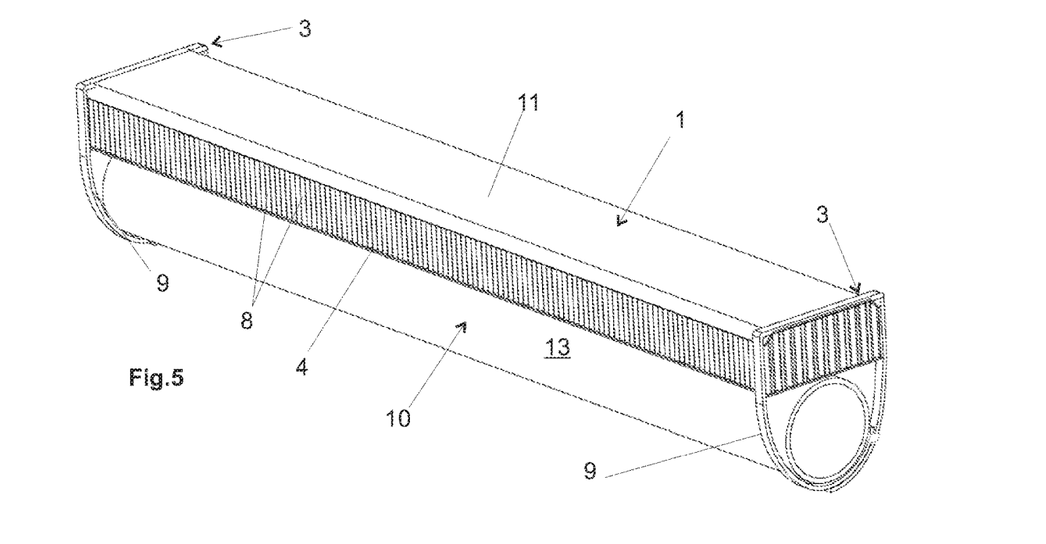
FIG. 5 shows an isometric view of the protective padding of FIG. 1 connected to a bar of a rollcage according to the present invention.

A first example of connecting means 3 is the cable tie 9 represented in FIGS. 5 and 6E. Specifically, the honeycomb cellular structure 2 is connected to the bar 10 by means of one or more cable ties 9, as shown in FIG. 5. The cable ties are types of fastener 9 that are ideal for connecting the honeycomb cellular structure 2 to the bar 10. Other types of fastener can be used, like belts or rings. The cable ties 9 are arranged so as to encircle the external sides of the honeycomb cellular structure 2 and the bar 10 so as to clamp the honeycomb cellular structure 2 to the bar 10.

Preferably, the connecting means 3 can comprise clip elements 17A,17B, as represented in FIGS. 7 and 8. These clip elements 17A,17B are shaped so as to clamp the bar 10 and to support the honeycomb cellular structure 3 and its sheet layers 4, 11.

Figure 7A:
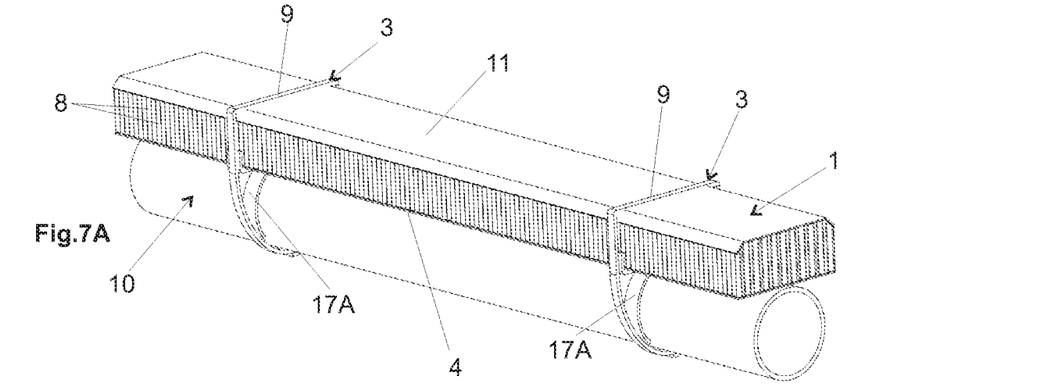
FIG. 7 show an isometric assembled view and an exploded view of the protective padding of FIG. 1 during a connection to a bar of a rollcage through connecting means comprising a first type of clip elements.
Figure 7B:
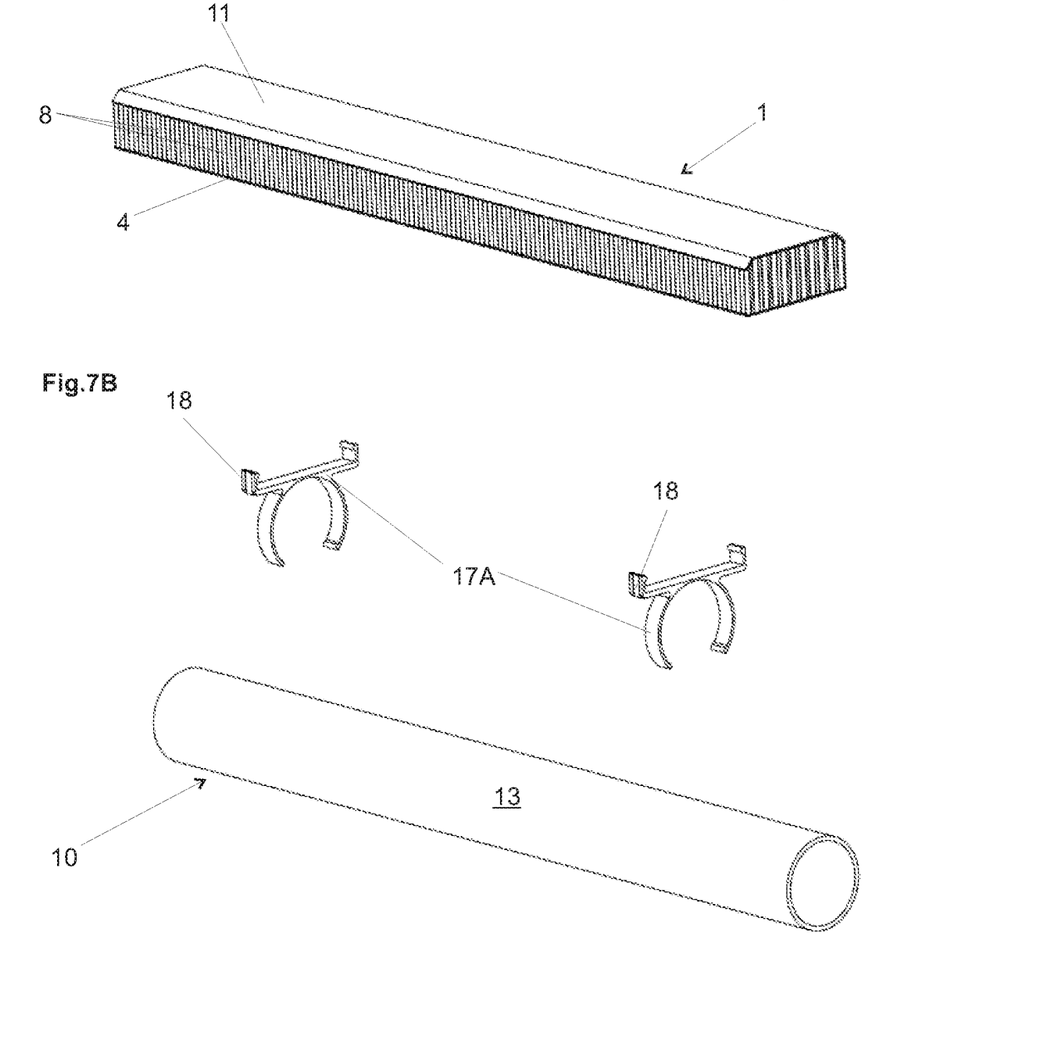

As shown in FIGS. 7, the clip elements 17A comprises two portions. The lower portion is C-shaped and configured to clamp the bar 10, while the upper squared portion is configured to receive the honeycomb cellular structure 3 and comprises a flat portion from which branch off two shoulders. FIG. 7B represents an exploded view wherein the bar 10 is separated from the clip elements 17A, which in turn is separated from the honeycomb cellular structure 3 and its sheet layers 4,11. FIG. 7A represents an assembled version, wherein the elements of FIG. 7A are tightened together by a fastener (cable-tie or zip-tie), that is accommodated in a groove 18 realized on the outer surface of the clip elements 17A, preferably in correspondence of said shoulders.

Figure 8A:
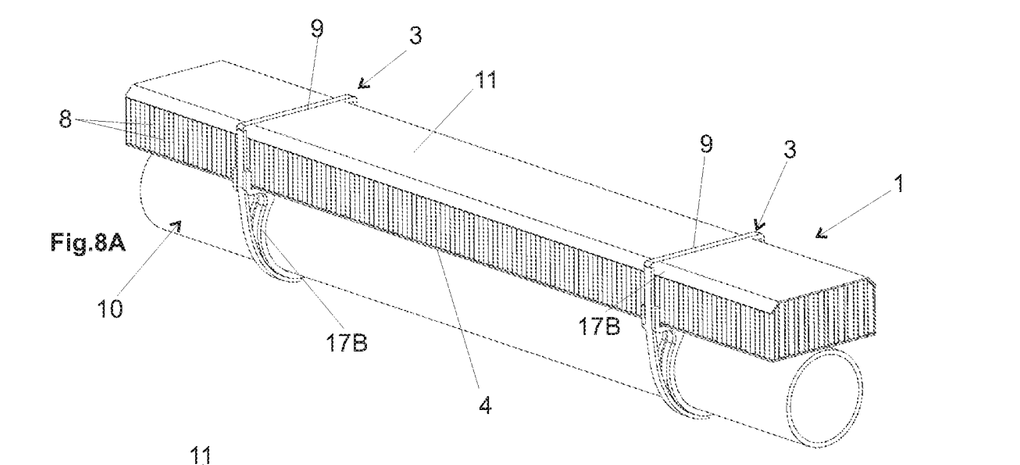
FIG. 8 show an isometric assembled view and an exploded view of the protective padding of FIG. 1 during a connection to a bar of a rollcage through connecting means comprising a second type of clip elements.
Figure 8B:
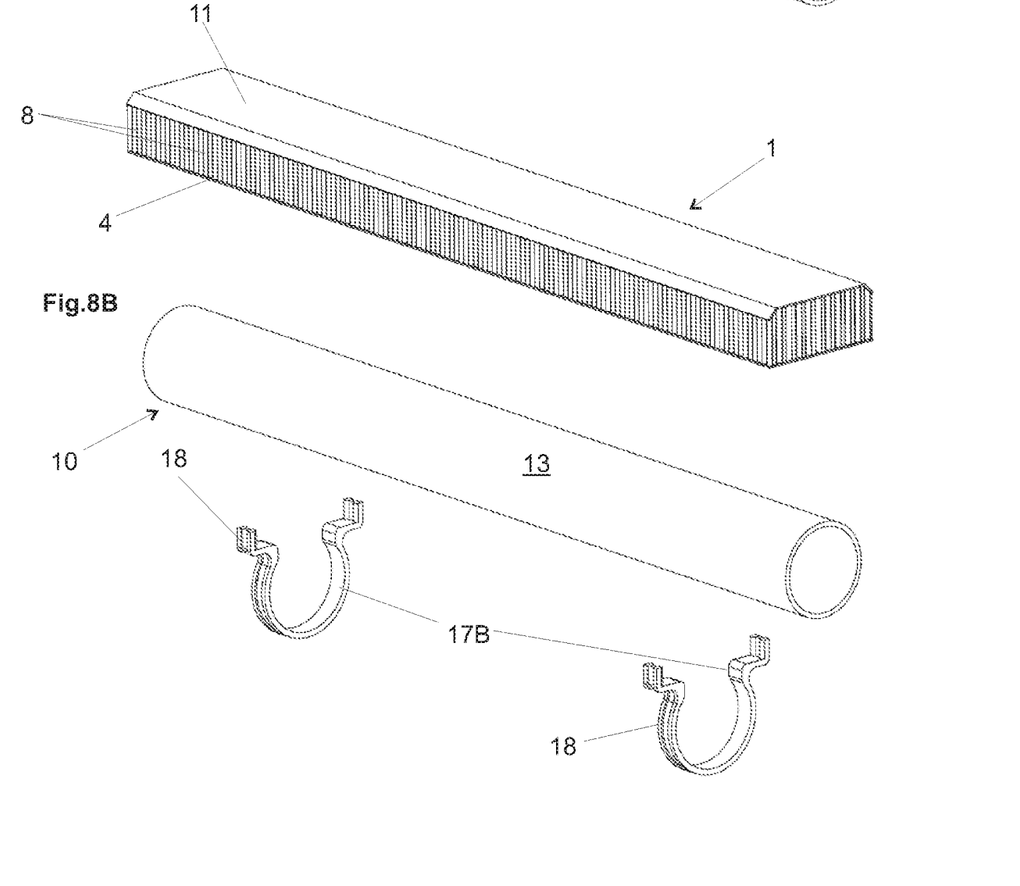

FIG. 8 represent another type of clip elements 17B. The clip elements 18 are Ω-shaped and at the ends of the Ω, two shoulders get out. The Ω-shaped portion is configured to clamp the bar 10, while the shoulders, together with the base of the Ω, are shaped to receive the honeycomb cellular structure 3. FIG. 8B represents an exploded view wherein the bar 10 is separated from the clip elements 17B, which in turn is separated from the honeycomb cellular structure 3 and its sheet layers 4,11. FIG. 8A represents an assembled version, wherein the elements of FIG. 8A are tightened together by a fastener (cable-tie or zip-tie), that is accommodated in a groove 18 realized on the outer surface of the clip elements 17B.

Alternatively, the connecting means 3 can be an adhesive or glue layer 12 arranged on the base face 15, as shown in FIG. 4, or onto the base sheet layer 4, as shown in FIGS. 6A and 6D. This adhesive or glue layer 12 allows to attach the honeycomb cellular structure 2 to the bar 10. The presence of a base sheet layer 4 allows to expand the surface on which the adhesive glue layer 12 can be arranged and consequently the tightness.

In a further alternative represented in FIG. 6B, the connecting means 3 comprise a shell consisting of two halves 5,6 connected each other. The upper half 5 surrounds the honeycomb cellular structure 2, acting as the outer sheet layer 11, and is made at least in part of a deformable material. The upper half 5 is connected to the lower half 6, which is rigid, by means of bolts 7. The lower half 6 acts as base sheet layer 4. When the upper half 5 is connected to the lower half 6 through the bolts 7, this shell 5,6 firmly clamps the honeycomb cellular structure 2 against the bar 10. The halves 5,6 are shaped so as to internally mate with the honeycomb cellular structure 2 and the bar 10.

Alternatively, the shape of the honeycomb cellular structure 2 itself can work as connecting means 3, as represented in FIG. 6C. In this embodiment, the honeycomb cellular structure 2 has a cross-section that is substantially a ring opened on one side. The inner cavity realized by the base face 15 adheres to the bar 10 and clamps it. Since the honeycomb cellular structure 2 is rigid but can slightly flex, the honeycomb cellular structure 2 can be forced against the bar 10 so as to slightly deform and reach the operative position around the bar 10. Once that the honeycomb cellular structure 2 is in this position, the pressure exerted on the bar 10 by the honeycomb cellular structure 2 itself, allows to maintain it in position and correctly oriented.

Figure 9:
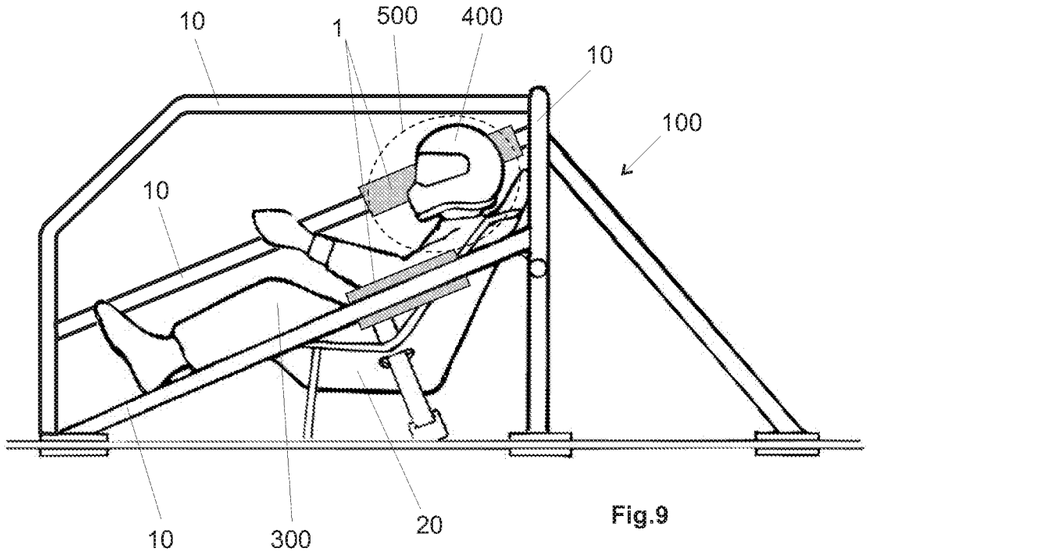
FIG. 9 shows a rollcage on which a protective padding according to the present invention has been installed on a rollcage of a vehicle.
Figure 10:
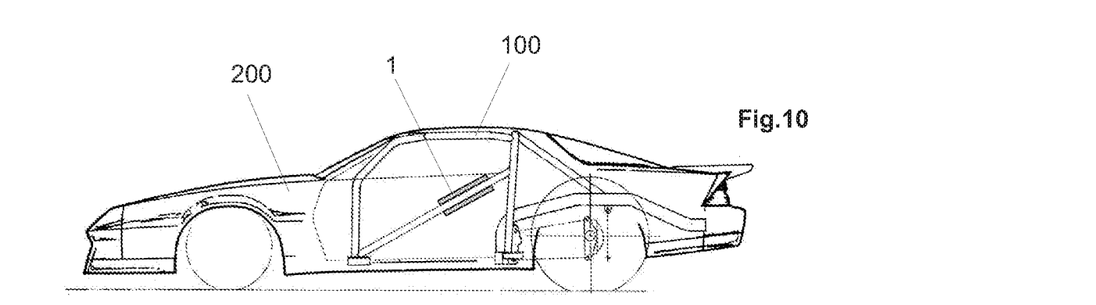
FIG. 10 shows a racing car having a rollcage on which a protective padding according to the present invention has been installed.

FIG. 9 represents a rollcage 100 comprising a plurality of bars 10. FIG. 10 shows the position wherein the rollcage 100 is arranged in a car 200. The bars 10 that are closer to the driver's body are more dangerous for the driver 300. In particular, the zone 500 of the rollcage is the nearest to the driver's helmet 400 and consequently the most risky for the driver 300. In case of impacts of the helmet 400 with these bars 10, the driver 300 risks his/her life. For this reason, these bars 10 comprise a protective padding 1 as represented in FIGS. 9 and 10. The protective paddings 1 are arranged on the bars 10 of the rollcage 100 so as to face towards the zone where the driver sits. The rollcage 100 can be shaped so as to accommodate the driver and the co-driver, thus more occupants of the vehicle. In this case, the protective paddings are arranged on the bars of the rollcage so as to face towards the zone where the occupant sit.

The same protective padding 1 can be also used with a rollbar or roll bar, thus an overhead metal bar of an automobile that is designed to protect the occupant in case of a rollover.

Concluding, the invention so conceived is susceptible to many modifications and variations all of which fall within the scope of the inventive concept, furthermore all features can be substituted to technically equivalent alternatives. Practically, the quantities can be varied depending on the specific technical requirements. Finally, all features of previously described embodiments can be combined in any way, so as to obtain other embodiments that are not herein described for reasons of practicality and clarity.

The invention claimed is:

1. A protective padding for a bar of a rollcage of a vehicle comprising a honeycomb cellular structure, a base sheet layer, an outer sheet layer, and connecting means configured to connect the honeycomb cellular structure to said bar;
   wherein said honeycomb cellular structure comprises a plurality of interconnected open cells having longitudinal axes arranged so that, when the honeycomb cellular structure is connected to the bar, part of said longitudinal axes are oriented outwardly with respect to the bar and towards the interior of the rollcage; said open cells being configured to absorb energy by plastic deformation in response to a compressive load compressing the honeycomb cellular structure against the bar;
   wherein the base sheet layer is firmly attached through an adhesive to edges of said open cells of a base face of the honeycomb cellular structure facing an outer surface of the bar and the outer sheet layer is firmly attached through an adhesive to edges of said open cells of a top face of the honeycomb cellular structure that is opposite to the base face;
   wherein the base sheet layer covers entirely the base face of the honeycomb cellular structure; and,
   wherein said base sheet layer and/or said outer sheet layer is a polymeric woven or non-woven fabric, a polymeric film or a thin layer of a composite material firmly attached to front edges of said open cells through an adhesive.

2. The protective padding according to claim 1, wherein the honeycomb cellular structure is shaped so as to partially surround the bar.

3. The protective padding according to claim 1, wherein the adhesive is a heat-activated adhesive.

4. The protective padding according to claim 1, wherein the longitudinal axes of said open cells are parallel to each other.

5. The protective padding according to claim 1, wherein the longitudinal axes are radially oriented with respect to an axis of symmetry of the protecting padding.

6. The protective padding according to claim 1, wherein at least a part of the longitudinal axes of said open cells are orthogonal to said base face or to a fictitious plan tangent to said base face.

7. The protective padding according to claim 1, wherein at least a part of the longitudinal axes of said open cells are inclined by an angle comprised between 5° and 45° with respect to a direction normal to said base face or to a fictitious plan tangent to said base face.

8. The protective padding according to claim 1, wherein the outer sheet layer is an outer cushion arranged at least in part over the top face of the honeycomb cellular structure.

9. The protective padding according to claim 1, wherein the connecting means comprise one or more clip elements configured to clamp the bar and to support the honeycomb cellular structure with respect to the bar.

10. The protective according to claim 9, wherein the connecting means comprise at least a cable tie.

11. The protective padding according to claim 9, wherein the connecting means comprise at least a fastener.

12. The protective padding according to claim 11, wherein the clip element comprises a groove configured to house at least partially said fastener.

13. The protective padding according to claim 12, wherein the tubes are cylindrical tubes.

14. The protective padding according to claim 1, wherein the connecting means comprise a shell configured to enclose at least part of the honeycomb cellular structure and of the bar.

15. The protective padding according to claim 14, wherein the thickness of sidewalls ranges between 0.06 and 0.15 mm.

16. The protective padding according to claim 1, wherein the open cells are tubes interconnected each other through open cells' sidewalls so as to form said honeycomb cellular structure.

17. The protective padding according to claim 16, wherein the diameter of cylindrical tubes ranges between 2.5 and 6 mm and/or the thickness of said sidewalls of the open cells is less than 0.3 mm.

18. A vehicle comprising:
a rollcage configured to encase at least an occupant, said rollcage comprising one or more bars;
one or more protective paddings according to claim 1 connected to said one or more bar so as to face head-on towards the interior of the rollcage.

* * * * *